UNITED STATES PATENT OFFICE.

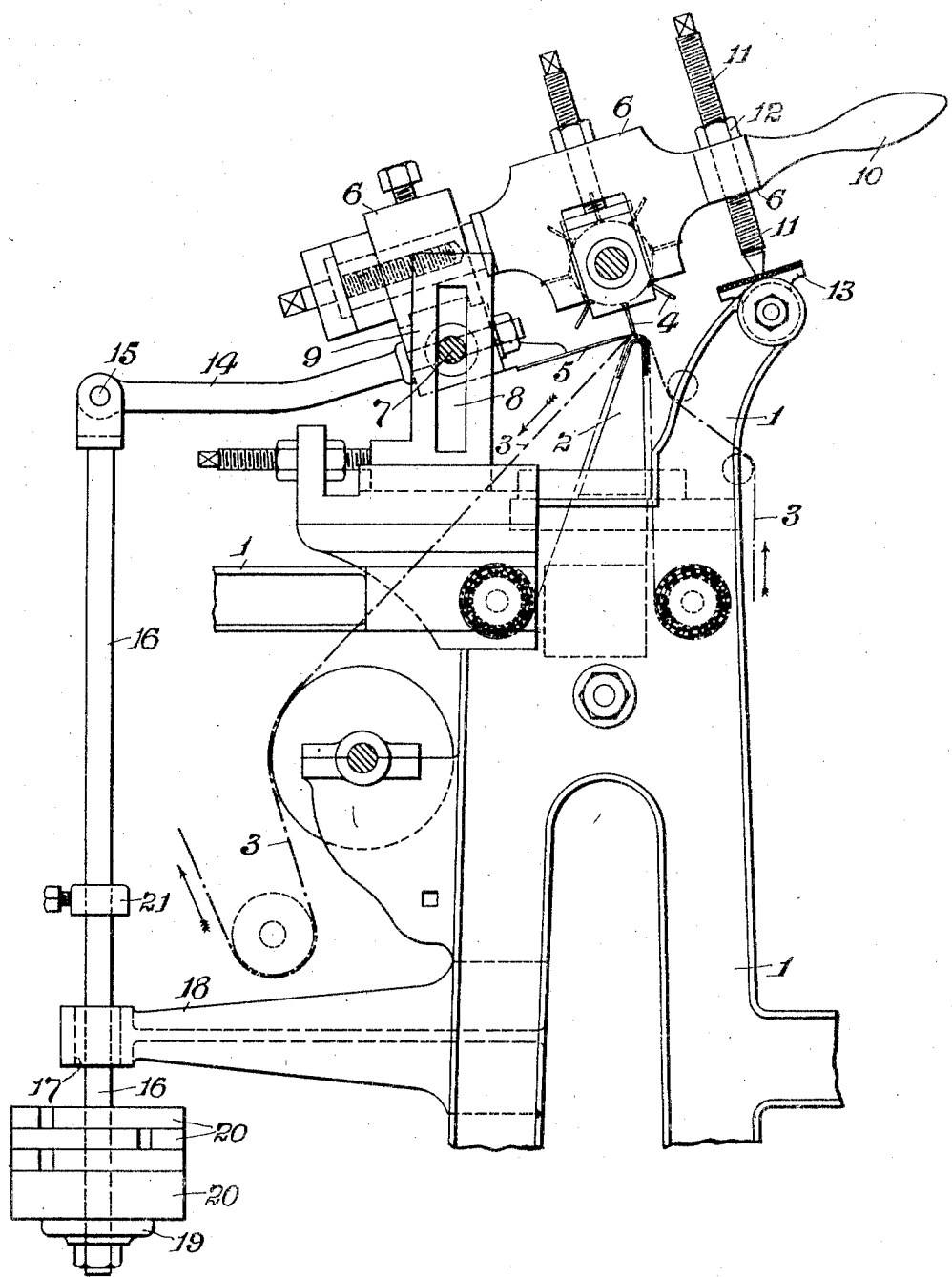

ARTHUR EDWIN SELLERS, OF HUDDERSFIELD, ENGLAND.

CLOTH CUTTING OR SHEARING MACHINE.

1,349,788.  Specification of Letters Patent.  Patented Aug. 17, 1920.

Application filed December 22, 1919. Serial No. 346,552.

*To all whom it may concern:*

Be it known that I, ARTHUR EDWIN SELLERS, a subject of King George V of Great Britain, residing at Huddersfield, in the county of York, England, have invented a new and useful Improvement in Cloth Cutting or Shearing Machines, of which the following is a specification.

This invention relating to cloth cutting or shearing machines has for its object the provision of means for balancing the handle and parts carrying the rotary cutter or perpetual in order that the said rotary cutter will be sensitive to any inequalities of the fabric under operation and operate equally on different weights of fabric within reasonable limits without adjustment, and adjust itself truly to the fabric as it travels under the cutter so as to give a better finish and handle, the balancing of the rotary cutter according to my invention enabling any type of cutting bed either solid, spring or rubber to be used and severing any knots or excrescences close to the face of the fabric without danger of cutting holes therein, thus saving labor and time in knotting and effecting the shearing operation in fewer rounds than is now necessary.

My invention consists in securing to each end of the stock carrying the usual ledger blade, a rearwardly extending arm or rod whose outer or rear end is pivotally connected to a link movable vertically in a guide in a bracket secured to the framing of the machine, the lower end of said link having a disk or collar thereon on which is adapted to rest a counter-balance weight or weights provided with slotted radial openings to enable same to be readily centered on the link or removed therefrom to add to or reduce the total weight required. Suitable stops limit the extent of downward movement of the blade stock and handle at the rear side of the pivot center about which the said handle and parts move so that if the handle be raised at the front, the action of the weights cannot overturn the cutting head.

The counter-balance is such that the rotary cutter is sensitively held in position to give a clear cutting action to the face of the cloth, the position of the said cutter relatively to the cutting bed being adjusted solely by weight.

The invention will be more fully described with reference to the accompanying drawing, which is an end elevation, partly in section, of so much of a cutting or shearing machine of the single cutter type as is necessary for my improvement to be understood.

Referring to the drawing, 1 represents the framework of the machine and 2 the cutter bed of suitable solid, spring rubber or like known construction, over which the fabric 3 to be shorn or cut is traversed, in the direction of the arrows, in the usual manner. 4 represents the usual rotary cutter which, together with its coöperating ledger blade 5, is carried at each end by a stock 6 adapted to swivel about a pin or bolt 7 adjustably screwed in a slot 8 in a bracket 9 on the frame 1. As at present constructed the front end of each stock 6 has a handle 10, and a setting pin such as 11 taking the form of a screwed spindle passing through the respective handle and locked by nut 12 each spindle abutting at its lower end against a respective fixed bed 13 carried by the frame, for adjusting the position of the rotary cutter relatively to the cutting bed according to the class or thickness of fabric to be sheared but in adopting my improvements it is found that the handles 10, spindles 11 and fixed beds 13 are unnecessary and may therefore be omitted.

According to my invention, I secure to the rear end of each stock 6 a rearwardly extending arm or rod 14 whose outer or rear end is pivotally connected as at 15 to a link 16 movable vertically in a guide 17 in a bracket 18 secured to the framework 1, the lower end of such link 16 having thereon a disk or collar 19 on which is adapted to rest a counterbalance weight or weights 20. Preferably the weight or weights 20 has or have slotted radial openings to enable same to be readily centered on the link 16 or removed therefrom to add to or reduce the total weight applied.

A collar 21 fast on each link 16 in appropriate position above the bracket 18 limits the downward movements of the link and consequently the permissible pivotal movement of the stock 6, so that if the handle 10 be raised, the action of the weights cannot overturn the cutting head.

The action of the counter balance 20 is such that the rotary cutter 4 and the coöperating ledger blade 5 are sensitively and yieldingly held in position to give a clear cutting action on the face of the cloth throughout its length.

The balanced cutter is sensitive to any inequalities of the fabric, and gives advantageous results, the shearing action being accomplished in fewer rounds than is now the case and cut lists or damage to rigged fabrics avoided.

The improvements are equally applicable in conjunction with each rotary cutter in multiple cropping or shearing machines.

Having thus described my invention, what I claim as new and desire to secure by Letters Patent is:—

In a cloth cutting machine, a frame, a support for the cloth, a stock pivoted to the frame and provided with a cutting device, an arm projecting from the stock, a guide bracket secured to the frame, a rod pivoted to the said arm and slidable vertically in the guide bracket, a counterbalance weight for the stock carried by the said rod, and a stop collar secured on the rod above the guide bracket and limiting its downward movement by contact with the guide bracket.

In testimony whereof I affix my signature in the presence of two witnesses.

ARTHUR EDWIN SELLERS.

Witnesses:
 AUGUSTUS E. INGRAM,
 FRED HAMMOND.